United States Patent [19]

Greenhouse et al.

[11] Patent Number: 4,793,786
[45] Date of Patent: Dec. 27, 1988

[54] EXTRUSION OF ARCUATE PRODUCTS

[75] Inventors: Eugene Greenhouse, Latham, N.Y.; Richard E. Durst, Austin, Tex.

[73] Assignee: Perfect Products, Inc., Rancho Cucamonga, Calif.

[21] Appl. No.: 928,152

[22] Filed: Nov. 7, 1986

[51] Int. Cl.$^4$ .................. A21C 11/16; B29C 47/34
[52] U.S. Cl. .................. 425/131.1; 425/133.1; 425/155; 425/308; 425/375; 425/462
[58] Field of Search .................. 425/131.1, 133.1, 377, 425/375, 462, 308, 155

[56] References Cited

U.S. PATENT DOCUMENTS

| | | | |
|---|---|---|---|
| 163,828 | 5/1875 | Wenzel | 425/131.1 |
| 279,131 | 6/1883 | Chase | 425/131.1 |
| 484,937 | 10/1892 | Megson | 425/131.1 |
| 1,228,495 | 6/1917 | Tanzi | 425/462 |
| 2,705,463 | 4/1955 | Moore | 425/131.1 |
| 2,750,900 | 6/1956 | Moore | 425/131.1 |
| 3,147,717 | 9/1964 | Smith | 425/131.1 |
| 3,241,502 | 3/1966 | Schafer | 425/133.1 |
| 3,280,763 | 10/1966 | Komberec | 425/308 |
| 3,776,671 | 12/1973 | Brushke et al. | 425/377 |
| 4,233,259 | 11/1980 | Pietrazus et al. | 425/131.1 |
| 4,248,577 | 2/1981 | Bory et al. | 425/462 |
| 4,395,221 | 7/1983 | Herrington | 425/131.1 |
| 4,536,147 | 8/1985 | Groff | 425/377 |

Primary Examiner—Willard E. Hoag
Attorney, Agent, or Firm—Milton M. Field; Harvey S. Hertzl

[57] ABSTRACT

A reconstituted banana product, which is formed primarily of banana puree with the addition of ice cream ingredients, is extruded by a horizontal extruder. As the extrudate stream is deposited on a moving product plate of a conveyor, which moves in the same direction as the extrudate stream, the extruder is moved transversely of the direction of movement of the extrudate stream and conveyor. After a product of the desired length is deposited on a product plate, a hot wire cutoff device slices the extrudate stream into separate products which by virtue of the transverse movement, are arcuate. In order to simulate the appearance of banana seeds, an auxiliary nozzle tube, within and centered in the main nozzle of the extruder, extrudes an extrudate of a darker color. The auxiliary nozzle tube has a closed end and slots extending from the closed end. Baffles at the base of the slots deflect the extrucate from the main extruder as the extrudate of darker color is extruded. The resulting product resembles a banana and has a pattern of the darker extrudant within its body simulating banana seeds. Protuberances in the main nozzle form grooves on the surface of the product, simulating the grooves on the surface of a peeled banana.

16 Claims, 6 Drawing Sheets

EXTRUSION OF ARCUATE PRODUCTS

BACKGROUND OF THE INVENTION

1. Field of the Invention

This invention relates to an apparatus and method for extruding arcuate frozen confections and, more particularly, to an apparatus and method for extruding reconstituted banana confections having a banana-like configuration and to reconstituted banana confections as made by the apparatus and method of the invention.

2. Brief Description of the Prior Art

Frozen bananas dipped or otherwise coated with chocolate or other candy-like coatings, often with an additional layer of crushed nuts, have become popular confections. However, such frozen banana confections frequently are not of uniform quality due to a lack of uniform ripeness in the banana used and due to the tendency of the bananas to turn black and thus be perceived by the consumer as unpalatable. Moreover, coated frozen banana confections are not amenable to automated processing.

It has been suggested in the prior art that simulated fruit confections may be made by extruding fruit purees mixed with additional ingredients. See, for example, U.S. Pat. Nos. 4,117,172 and 4,119,739 which teach making simulated berries and cherries in this way. However, the arcuate configuration of bananas cannot be readily replicated with existing extrusion apparatus. Although U.S. Pat. Nos. 4,152,102 and 4,025,260 teach the use of shaped extrusion nozzles for forming semi-circular or curled food products, it is difficult with such shaped nozzles to effect the arcuate shape and generally round cross section of bananas. It is also difficult with such apparatus to provide coloring material within the reconstituted banana to stimulate the banana's seeds.

More promising are horizontal extruders of the type manufactured by Glacier Industries, Inc. which can extrude elongated frozen confection "logs" and which are amenable to the use of auxillary extrusion orifices within the extrusion chamber of effect variations in the color of the product cross section as is shown, for example, in U.S. Pat. No. 3,840,311. Such machines include an extrusion head assembly mounted on a movable tracking platform and having a horizontal extrusion nozzle. The extrusion nozzle is positioned above moving product plates of a conveyor and extrudes a semi-solid extrude stream. The platform is moved so that the extrusion nozzle tracks the moving product plates moving from a starting point in the same direction as the plates, but at a slower speed, as the extrusion stream is deposited on a product plate. After a confection product of desired length is deposited on the product plate, a hot wire cutoff device slices the extrudate stream. The platform is then moved rapidly in the reverse direction to bring the extrusion nozzle back to the starting point in time to deposit the next confection product on the next moving product plate. While the extrusion nozzle orifice may be shaped and dimensioned so that the confection products have the generally round cross section and diameter of bananas, the confections will be straight, unlike the arcuate configuration of bananas.

SUMMARY OF THE INVENTION

It is accordingly an object of the present invention to provide a reconstituted banana confection.

A further object involves a modification of the above described horizontal extruder apparatus of the prior art so that it deposits arcuate confection products on the conveyor and, more particularly, confection products having banana-like configurations.

Other objects concern the provision of means to simulate the seeds of a banana in the reconstituted banana confection of the invention and the provision of longitudinal grooves on the surface of the product to simulate the grooves on the surface of a peeled banana.

Briefly, according to the invention, the aforementioned horizontal extruder equipment is modified by providing drive means to displace the extrusion head assembly. and with it the extrusion nozzle, transversely of the direction of motion of the extrudate stream and of the product plates of the conveyor, one such cycle of transverse motion being effected for each successive product as it is deposited on a product plate. As a result, each of the products is arcuate. The transverse movement begins after the extrudate stream first touches the product plate during the forward tracking movement of the extrusion head assembly. In one embodiment, the outward transverse movement is continuous with the return transverse movement so that the product is formed with a continuous arc. In a second embodiment, the outward transverse movement is completed about halfway through the deposit of a product with the transverse displacement then held until the hot wire cutoff device has sliced the extrudate stream at which time the extrusion head assembly is rapidly returned to its initial transverse position. The resulting product has an initial arcuate portion and a final straight portion - a shape characteristic of bananas.

The reconstituted bananas are formed of a partially frozen extrudate comprising primarily of fully ripened banana puree with the addition of standard ice cream ingredients, including milkfat and nonfat milk, sweeteners, lecithin and stabilizers. After the product is enrobed with chocolate and crushed peanuts, it to a large extent duplicates the flavor, texture, and appearance of a chocolate coated frozen banana confection.

In order to simulate the appearance of banana seeds, the extrusion head comprises within a main outer nozzle an inner nozzle having a plurality of radial apertures for a carmel colored extrudate which effect the appearance of banana seeds in the simulated banana products. The inner nozzle is formed by a tube having a closed end and a plurality of slots extending from the end of spaced points around the wall of the tube. The slots are shielded by a like number of fingers extending outwardly at an angle from the base of the slots. By properly controlling the flow rate of the carmel colored extrudate, the central portion of the extruded product includes a plurality of radial lines of darker color resembling the seeds of a banana.

In order to mimic the appearance of the grooves which extend longitudinally on the surface of a peeled banana, a number of spaced protuberances are placed at spaced points about the periphery of the main nozzle orifice.

BRIEF DESCRIPTION OF THE DRAWINGS

These and other objects, features and advantages of the invention will be more fully appreciated with reference to the accompanying drawings, in which.

DETAILED DESCRIPTION OF THE PREFERRED EMBODIMENTS

Figure 1:
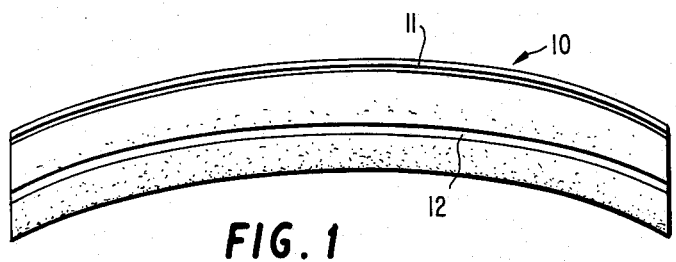
FIG. 1 is a plan view of a banana confection of the invention.
Figure 2:
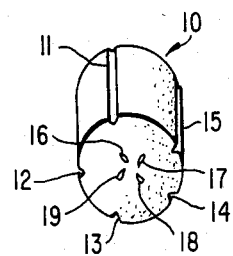
FIG. 2 is a perspective view of the banana confection of FIG. 1, viewed from an end.

A first embodiment of a reconstituted banana confection according to the invention is shown in FIGS. 1 and 2. The banana confection 10 is arcuate and has, at spaced points about the periphery of the banana confection, a number of grooves simulating the naturally occurring grooves which are characteristic of the surface of peeled bananas, five of which 11, 12, 13, 14 and 15 are shown. In the perspective view of FIG. 2, it will be noted that there are four radial lines 16, 17, 18 and 19 near the central axis of banana confection 10. These lines are made of the same ingredients as the main body of the confection with caramel color added. These dark lines, which are about 3/16 inch long, simulate the appearance of banana seeds.

The banana confection is formed from a partially frozen semi-solid mix comprised primarily of a banana puree prepared from fully ripened bananas with the remainder formed of a standard ice cream mix including milkfat and nonfat milk, sugar, corn sweetner, lecithin, stabilizers, such as xanthan, locust bean and guar gums with the addition of vanilla flavoring. When enrobed with chocolate and crushed peanuts and frozen, the product resembles chocolate covered frozen bananas in appearance (with the ends sliced off), texture and flavour.

Figure 3:
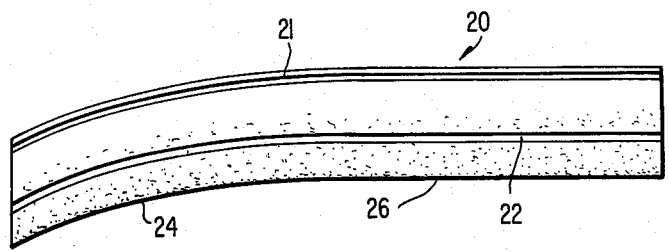
FIG. 3 is a plan view of a second embodiment of a banana confection of the invention.

Another embodiment of the reconstituted banana confection is shown in FIG. 3. The banana confection 20 has an initial arcuate portion 24 and a straight portion 26, thus simulating the shape of many naturally occurring bananas. As with the embodiments of FIGS. 1 and 2, banana confection 20 has grooves which simulate the grooves on the surface of a peeled banana.

The apparatus for making the banana confections of FIGS. 1 and 3 is shown in FIGS. 4–9. A horizontal extruder 30 is mounted on a work table 32 upon which mounting base plates 34 and 35 are surmounted. Roller guide support bocks 36, 37, 38 and 39 are mounted on base plate 35. A roller guide 40 extends between and is supported by blocks 36 and 38 on one side of the device, while on the other side (see FIG. 4) roller guide 41 is parallel to roller guide 40 and is supported by blocks 37 and 39. A sleeve 42 surrounds roller guide 40 and extends between roller bearing housings 43 and 44, the roller bearings of which engage roller guide 40. A similar sleeve and roller bearing housings (not shown) relate in the same way to roller guide 41.

Platform support members 45 and 46, which support a tracking platform 48, are mounted on roller bearing housings 43 and 44, respectively, and similar platform support members ride on the roller bearing housings guided on roller guide 41. As will be explained hereinafter, tracking platform 48 will be driven back and forth on roller guides 40 and 41 by a cam 132.

Figure 4:
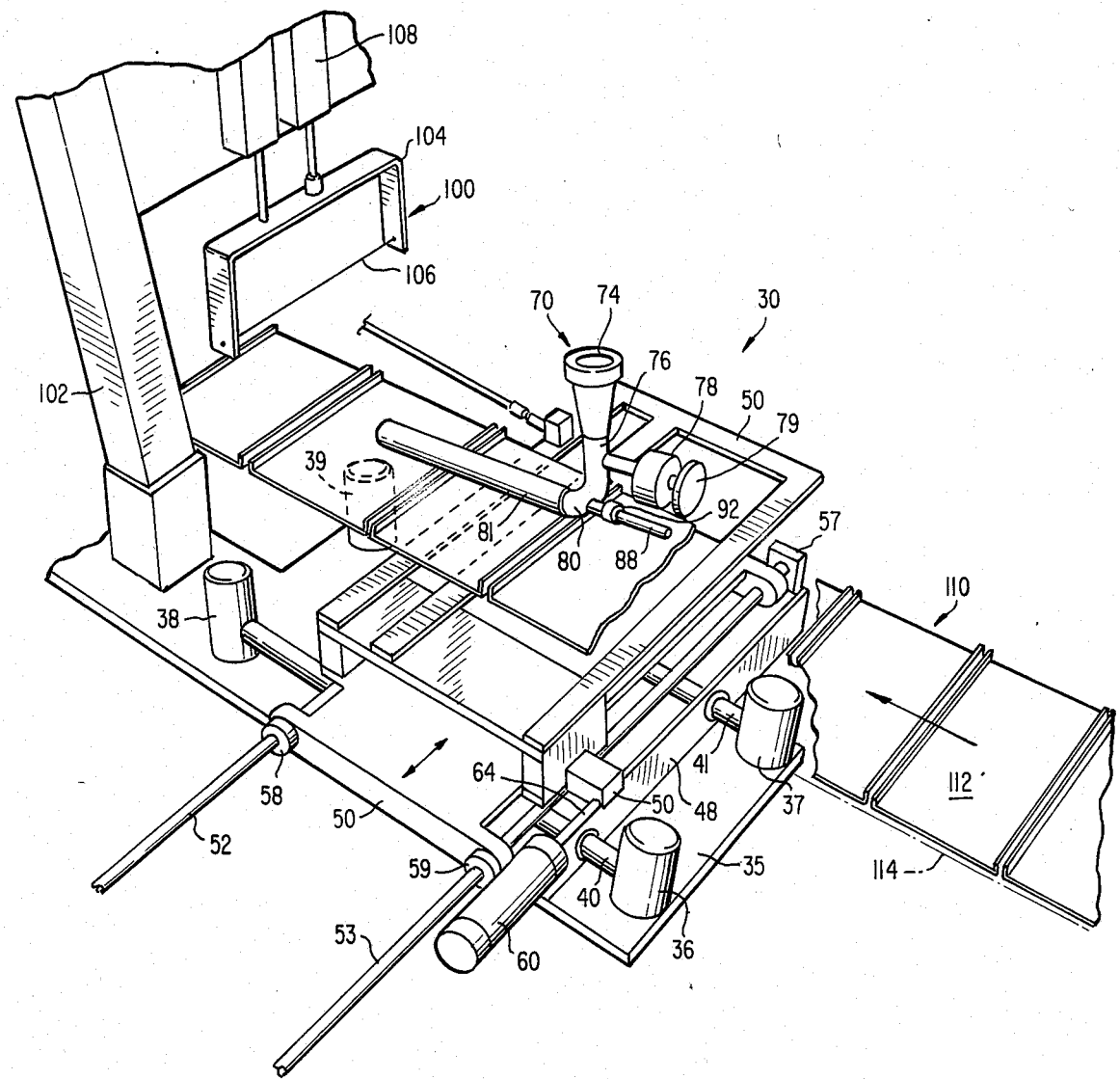
FIG. 4 is a perspective overall view of the apparatus of the invention.
Figure 6:
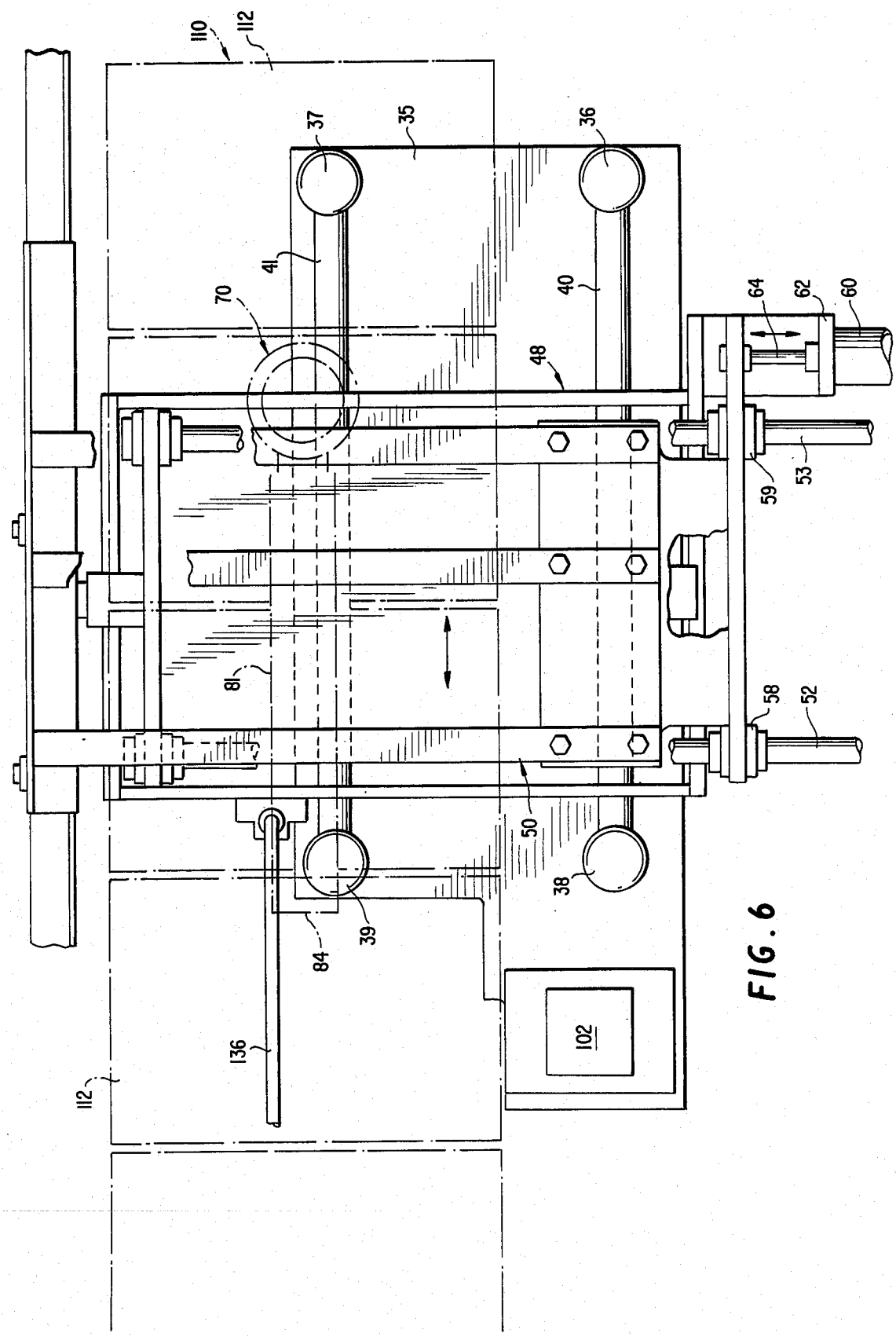
FIG. 6 is a top view of the apparatus of the invention.

A second movable platform 50 is supported above tracking platform 48 on transverse guide rods 52 and 53 which are supported by transverse guide supports 57, only one of which is shown in FIG. 4, mounted on tracking platform 48. This transverse platform 50 is slidable along transverse guide rods 52 and 53 by employing low friction bushings 58 and 59. In order to impart transverse movement to transverse platform 50, a double-acting air cylinder 60 is provided. As is seen in FIGS. 4 and 6, air clyinder 60 is mounted on tracking platform 48 and drives an actuator arm 64 engaged with transverse platform 50.

Figure 5:
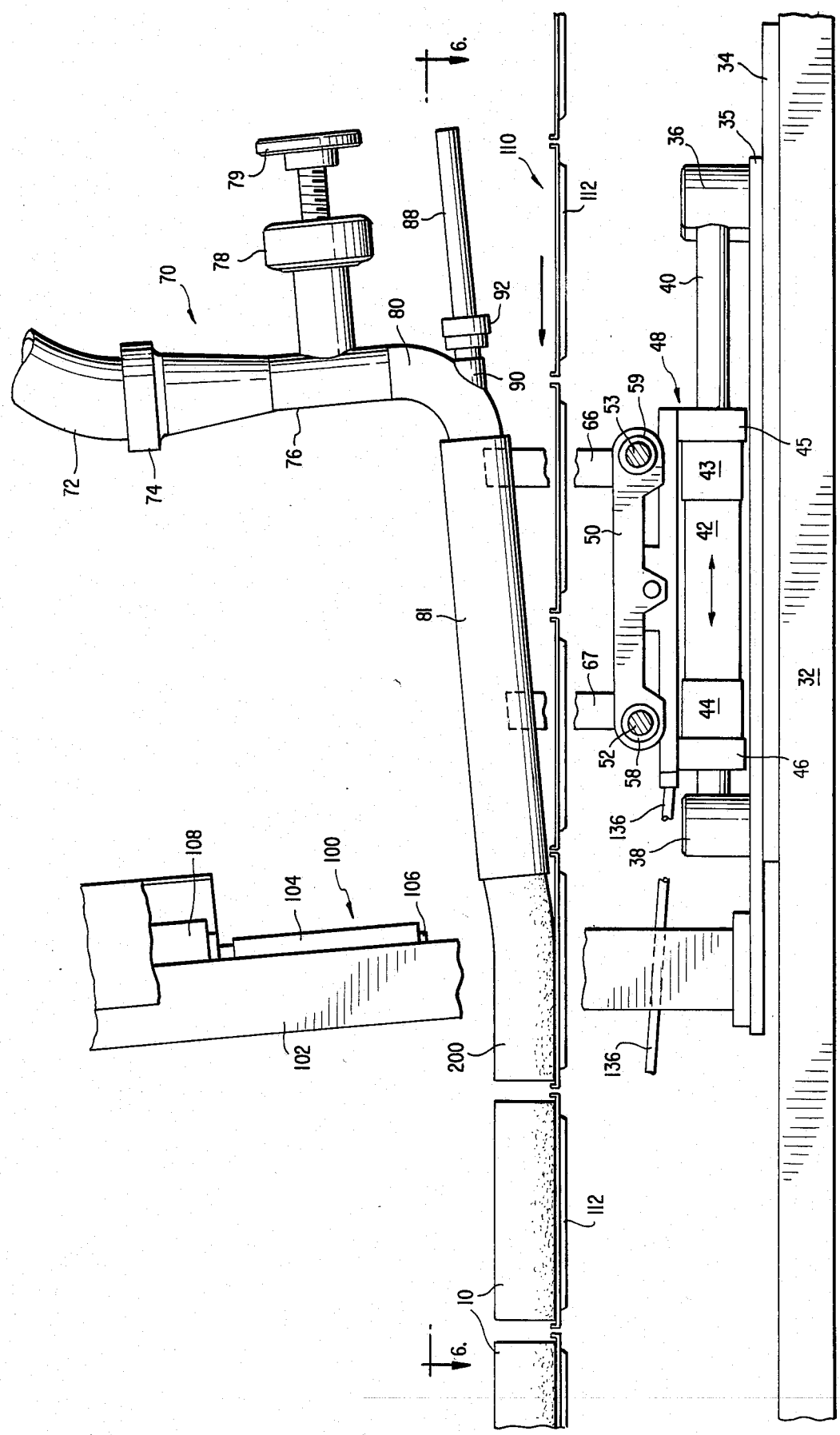
FIG. 5 is a side elevation view of apparatus of the invention.

A horizontal nozzle head assembly 70 is mounted on transverse platform 50. As shown in FIG. 5, a nozzle barrel 81 of assembly 70 is supported on pillars 66 and 67 extending upwardly from platform 50.

Figure 7:
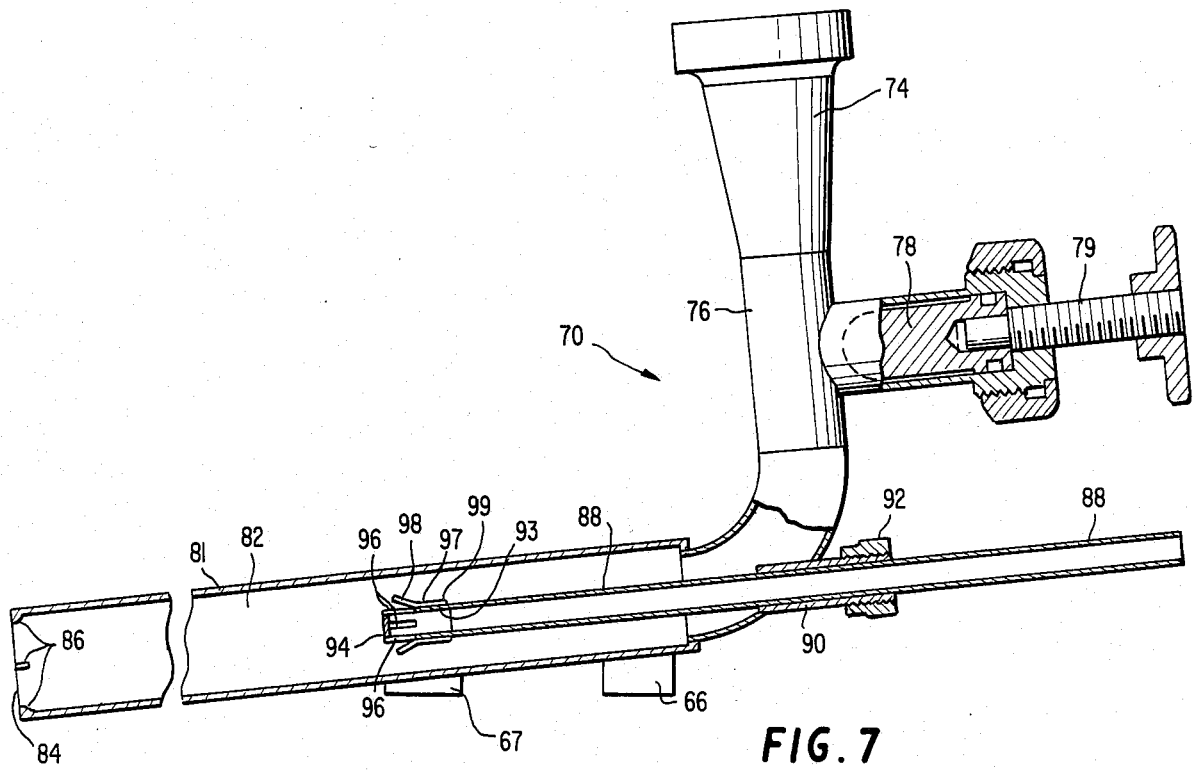
FIG. 7 is a section view of the extrusion nozzle of the apparatus of the invention.

As is best seen in FIGS. 5 and 7, horizontal extrusion head assembly 70 receives partially frozen semi-solid extrudate through flexible tube 72. The extrudate which is cooled to about 20–22 degrees F. in a freezer is pumped by a variable rate pump (not shown). Flexible tube 72 is coupled to a receiving section 74 leading to a valve section 76, which may be partially blocked by a valve member 78 actuated by a valve wheel 79 to provide fine control of the flow rate of the extrudate. Coarse control of the flow rate is provided by the variable rate pump pumping the extrudate from the freezer. Valve section 76 leads to an elbow section 80 feeding. nozzle barrel 81. Within nozzle barrel 81 is an extrusion chamber 82 which typically may have an internal diameter of 1⅛ inch and a length of about seven inches. The open end 84 of barrel 81 forms a nozzle orifice. In order to provide longitudinal grooves on the surface of the extruded product to simulate the grooves which naturally appear on the surface of a peeled banana, a number of protuberances 86 are provided at spaced points around the periphery of orifice 84 and extend into the orifice.

So that the extruded product will contain darkened marks 16, 17, 18, and 19, as shown in FIG. 2, an auxillary nozzle tube 88 is provided within and concentric to main nozzle barrel 81. Nozzle tube 88 enters nozzle barrel 81 through a sleeve 90, which is mounted in a hole in, and is welded to, the wall of elbow 80. Nozzle tube 88 is slidably received through sleeve 90 and extends into nozzle barrel 81, being concentric therewith. The position of nozzle tube 88 within nozzle barrel 81 is adjusted and nozzle tube 88 is locked in place by a Cajun Ultra-Torr fitting 92 threaded on a threaded portion of the outer wall of nozzle tube 88.

A nozzle outlet fitting 93 is connected to the end of nozzle tube 88, and the distal end of nozzle fitting 93 is closed by a closure plate 94. Immediately adjacent closure plate 94, four equally spaced slots 96 are cut through the wall of fitting 93. Just behind these slots, four baffle members 97 are positioned on the outer wall of fitting 93. Each baffle member includes a baffle finger 98 extending outwardly at an angle of about thirty degrees and a base portion 99 welded to the outer surface of fitting 93. Nozzle tube 88 has an internal diameter of about 5/16 inch. Slots 96 are about 5/16 inch long and 1/16 inch wide. Fingers 98 are ¼ inch long and about 1/16 inch wide, while base portion 99 is about ⅜ inch long.

An extrudate which is identical to the extrudate provided through tube 72, but with addition of a carmel coloring agent, is pumped into nozzle tube 88 from a freezer. The flow rate is controlled by controlling the pump rate of a variable rate pump. Alternatively, a valve may be provided to control the flow. Baffle fingers 98 deflect the flow of the extrudate flowing through extrusion chamber 82 from section 74 to allow entry into the extrudate stream of the caramel colored extrudate being extruded through slots 96.

In order to slice the extrudate stream 200 flowing horizontally from nozzle head assembly 70, a cutoff mechanism 100 is provided. A standard 102, mounted on base plate 35, supports the cutter mechanism which includes an inverted U-shaped holder 104, the open side of which is closed by a hot cutter wire 106. A double acting air cylinder 108 actuates cutter 100, driving hot wire 106 rapidly downwardly through extrudate stream 200 close to nozzle orifice 84 to separate the extrudate stream into individual confection products 10. Air cylinder 108 then immediately retracts hot wire 106. Extrudate stream 200 is deposited on a moving conveyor 110 which comprises a plurality of successive product plates 112 mounted for movement with a drive chain 114. As in best seen in FIGS. 4 and 5, product plates 112 are moved through a gap provided above transverse platform 50 and below horizontal extrusion head assembly 70. Extrudate stream 200, moving horizontally from extrusion head assembly 70, is thus deposited from above upon successive product plates moving in the same direction.

Figure 8:
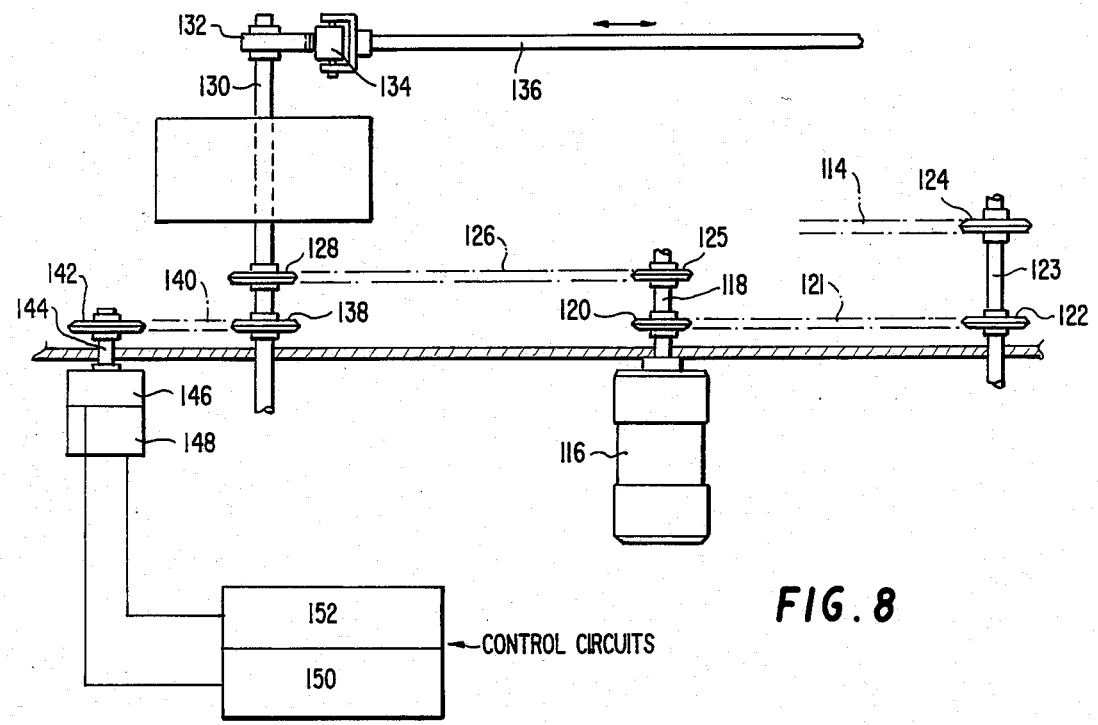
FIG. 8 is a schematic diagram of the drive mechanism of the apparatus of the invention.

Tracking platform 48 is driven in its forward and reverse tracking movements by, as seen in FIG. 8, cam 132 mounted on a cam shaft 130. Cam 132 is shaped in a manner well known in the prior art horizontal extruder apparatus as manufactured by Glacier Industries, Inc. of Austin, Texas (for example, see the horizontal extruder used in Glacier Industries, Inc., model "Glacier 600") to impart tracking movement to tracking platform 48 first in the same direction as the moving product plates 112 of conveyor 110, but at a slower speed, and then after cutter 100 has sliced extrudate stream 200, to drive tracking platform 48 rapidly back to its starting position in time to deposit the extrudate stream on the next product plate. The motion of cam 132 is imparted from the cam by cam follower 134 through a connecting rod 136, the other end of which is mounted on tracking table 48, as seen in FIG. 5.

As shown in FIG. 8, the drive mechanism for the apparatus includes a drive motor 116 driving a drive shaft 118. A sprocket 120 on drive shaft 118 drives a chain 121 engaged with a sprocket 122 on conveyor drive shaft 123. A drive sprocket 124 on shaft 123 is engaged with conveyor chain 114 driving the chain and with it, product plates 112, continuously. Another sprocket 125 on motor shaft 118 drives a chain 126 which, in turn, drives sprocket 128 on cam shaft 130, thus driving cam 132. A sprocket 138 on cam shaft 130 drives a chain 140 which is engaged with a sprocket 142 on candy switch shaft 144. A pair of candy switches 146 and 148 are mounted in tandem on switch shaft 144. Each of the candy switches is adjusted to close switches at selected times during the cycle of rotation of switch shaft 144. Since switch shaft 144 is driven from the same drive motor 116 as conveyor drive shaft 123, it will be readily appreciated that the rotation of switch shaft 144 is directly related to the rotation of conveyor drive shaft 123 and, hence, to the positions of product plates 112 relative to nozzle orifice 84 of horizontal nozzle head assembly 70. Thus, the times of the closure of switches in candy switches 146 and 148 can be related to the positions of successive product plates 112 as they pass under extruder head assembly 70. Candy switch 146 controls switches in an air cylinder control circuit 150 for controlling air cylinder 60 which imparts transverse movement to extruder head assembly 70. Likewise, the switches controlled in candy switch 148 are part of air cylinder control circuit 152 for controlling air cylinder 108 which actuates cutter 100.

Figure 9:
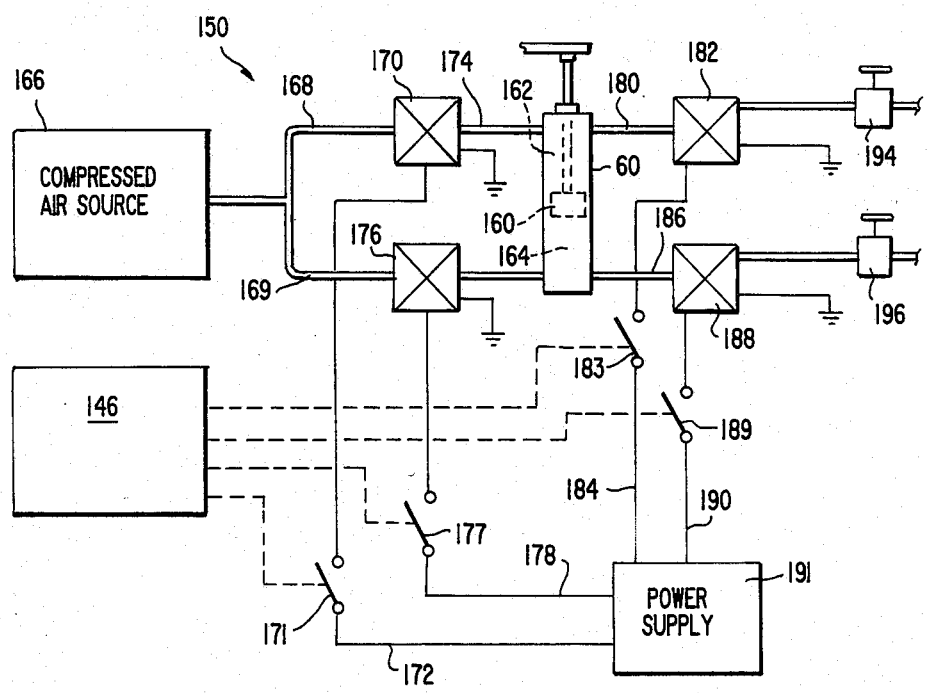
FIG. 9 is a circuit diagram showing the control circuit of an air cylinder of the apparatus of the invention.

Turning to FIG. 9, air cylinder control circuit 150 controls the application of compressed air to and the exhaust of air from either side of double-acting air cylinder 60. The cylinder has a piston 160, on which actuator arm 64 is mounted, a chamber 162 above the piston and a chamber 164 below the piston (referring to the orientation of the cylinder in the figure). A source of compressed air 166 from an air compressor is connected through conduits 168 and 169 to respective solenoid valves 170 and 176. Actuation of solenoid valve 170 is controlled by a switch 171, which is closed in candy switch 146, connecting the solenoid in circuit with power supply 191 through line 172. At the same time, the candy switch closes a switch 189 completing the circuit through the solenoid of a solenoid valve 188 from power supply line 190 to actuate valve 188 opening an exhaust line 186. Upon the actuation of valve 170, compressed air is supplied to chamber 162 driving piston 160 down as air is exhausted through valve 188. The rate of movement of piston 160 is a function of the rate at which air is exhausted through exhaust line 186, valve 188, exhaust line 192, and a manually adjustable flow control valve 196. In practice, valve 188 itself may incorporate the adjustment function, and flow control valve 196 could be omitted. Since the transverse movement of transverse platform 50 in the outward direction corresponds with about one half the length of the extruded product, flow control valve 196 is adjusted to restrict the exhaustion of air from chamber 164 so that movement of piston 160 will continue until one half the length of the extruded product has been deposited on a product plate 112. When it is time to retract transverse table 50, candy switch 146 closes switches 177 and 183, completing the circuits to solenoid valves 176 and 182 from voltage source lines 178 and 184, respectively. Compressed air is now directed through valve 176 through conduit 179 to chamber 164, and air is exhausted from chamber 162 through conduit 180, valve 182, conduit 185 and flow control valve 194. In one embodiment, switches 177 and 183 are closed at the product halfway point to initiate the return transverse movement; low control valve 194 restricts air exhaustion from chamber 162 so that the return movement of piston 160 is completed at the time cutter 100 is actuated. In a second embodiment, the outward transverse movement is again completed at the product halfway point, but switches 177 and 183 are not closed until just after actuation of cutter 100. At this time, compressed air is applied to chamber 164 through valve 176, and exhausted from chamber 162 through valves 182 and 194. This time, however, valve 194 does not restrict flow as much with the result that the return transverse movement is rapid and completed before it is again time to initiate outward transverse movement.

Control circuit 152 for air cylinder 108 to cutoff device 100 is virtually identical to control circuit 150 just described. However, because cutter 100 is operated rapidly in both its slicing and retraction movements, there is no need for flow control on the exhaust side. Of course, the timing of the closure of switches in control circuit 152 will be determined in candy switch 148.

Figure 10:
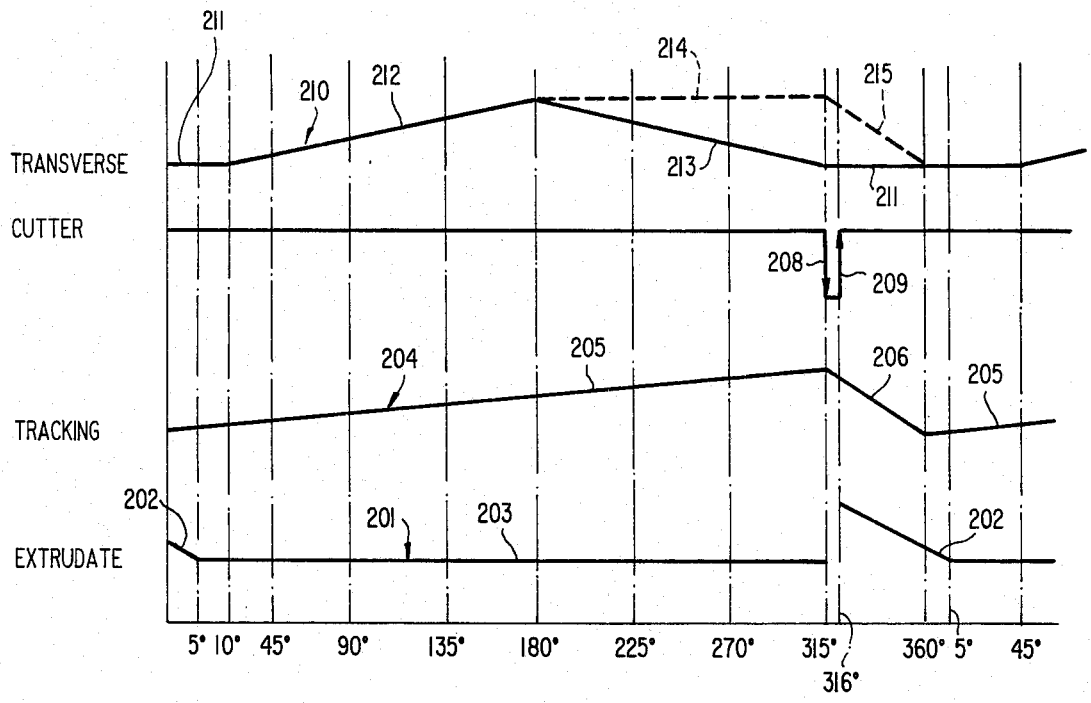
FIG. 10 is a timing diagram for illustrating the operation of the apparatus.

The operation of the apparatus of the invention will be described with reference to the timing diagram of FIG. 10 in which curve 201 represents the relationship of extrudate stream 200 and a product plate 112. Curve 204 represents the tracking motion of tracking platform 48 in the same direction or the reverse direction as product plates 112 and extrudate stream 200. Arrows 208 and 209 indicate respectively, the cutting motion of hot wire cutter 106 and the retraction thereof. Curve 210 represents the transverse movement of transverse platform 50 in a direction perpendicular to the direction of motion of tracking platform 48, product plates 112 and extrudate stream 200. The horizontal coordinates of the diagram of FIG. 10 represent the rotation of cam 132 in radians. At 0°, both tracking platform 48 and transverse platform 50 are at their starting positions as indicated by the positions of curve 204 and 210. Extrudate stream 200, however, as shown by curve 201, having recently been sliced by cutter 100, is not yet in contact with a product plate 112. This is indicated by the raised position of curve section 202. Beginning at 0°, the forward tracking movement of tracking platform 48 is initiated by cam 132 and, as shown by curve section 205, movement in the forward tracking direction begins. However, as shown by curve section 211, transverse platform 50 remains in its starting position. At 5°, extrudate stream 200, as indicated by curve 201 begins to be deposited on a product plate 112; and curve section 203 signifies that the extrudate stream is thereafter laid on a product plate 112. Shortly thereafter at 10°, outward transverse movement of transverse platform 50 begins, as indicated by curve section 212, and continues until about half the product is deposited on product plate 112 at about 180°. In the case of the first embodiment, at 180° the transverse movement of transverse table 50 reverses direction, as controlled by air cylinder 60, and begins its transverse movement back to its starting position as shown by curve section 213. At 315°, transverse platform 50 is back to its starting position and cutter 100 initiates movement of hot wire 106 through extrudate stream 200 as indicated by arrow 208. Immediately thereafter, at 316°, the cutter wire 106 is retracted as shown by arrow 209. At 315° also, forward tracking motion of tracking platform 48 is completed, and cam 132 reverses the direction of tracking platform 48 as indicated by curve section 206. The reverse or flyback tracking motion is rapid and is completed by 360°, the start of the next product cycle, allowing time for extrudate stream 200 to come into contact with the next product plate 112 at 5°, as indicated by curve section 202. By virtue of the transverse movement of transverse platform 50, the resulting product has the continuously arcuate banana-like configuration illustrated by product 10 in FIG. 1.

In the second embodiment, a different mode of operation is used. The transverse movement of transverse platform 50 begins, as before at time 10°, and outward movment 212 continues until time 180°. At this time, the outward position is held constant, as shown by dash line curve portion 214, until 315°. Transverse platform 50 then is returned rapidly transversely to its initial position, as shown by dash line curve portion 215, arriving there by 360°. The resulting product, as illustrated by product 20 of FIG. 3, has an arcuate portion 24 and a straight portion 26, simulating the hook-like configuration of some bananas.

Although two embodiments involving two different modes of transverse motion of transverse platform 50 have been disclosed, it will be readily appreciated that other patterns of transverse movement of transverse platform 50 may be used. It is therefore possible, by appropriate adjustment of the timing of the outward and return movements, to extrude banana-shaped products of slightly different shapes and proportions as well as a wide variety of other extruded confections having, at least in part, arcuate configurations.

After extrudate stream 200 is sliced by cutter 100, the now separate products 10 or 20 are moved by product plates 112 of conveyor 110 into a hardening tunnel where they are hard frozen. In order to retain the groove indentations made by protuberances 86 until product 10 or 20 reaches the hardening tunnel, it is necessary that the extrudate be of sufficient stiffness. This can be adjusted by appropriate choices of the temperature and thickness of the extrudate mixture.

The stiffness of the extrudate also affects the extent of the arc imparted by the transverse movement. Stiffer extrudates tend to resist the arcuate deflection of the product with the resulting products having arc deflections somewhat smaller than the transverse movement of platform 50, while the arcs of looser extrudates more closely follow the amplitude of the transverse movement of platform 50. The size of the lateral displacement of transverse platform 50 is thus determined by the desired arcuate deflection in the product with due allowance for the aforementioned stiffness factor. It has been found, for example, that a transverse displacement of transverse platform 50 of 1-1½ inches will provide a satisfactory arcuate displacement of about ½ inch in the resulting product.

After the products are hard frozen, they are removed from product plates 112 into an enrobing unit where they are enrobed with chocolate or other coating and then transferred to wrapping apparatus.

As is known in the horizontal extruder art, the rate of flow of extrudate from extrusion head assembly 70 must be related to the speed of product plates 112 of conveyor 110, the speed of which is variable up to sixty plates per minute. The speed $V_t$ of the tracking movement of tracking platform 48 is related to the speed $V_p$ of product plates 112 and the speed of the extrudate stream $V_e$ in accordance with the equation $V_t = V_p - V_e$.

The length $L_t$ of the forward tracking movement of tracking platform 48 is governed by the following equation in which $L_p$ is the length of the product plates 112, $L_e$ is the length of the extruded product, and R is the flyback time in degrees:

$$L_t = L_p - L_e - \frac{R}{360} \times 2$$

Thus, in the case of 7½ inch product plates 112, a product length of 5½ inches, and a flyback of tracking platform 48 of 45°, the forward tracking distance is 1¾ inches.

In commercial production of the confections of the invention, a number of laterally spaced horizontal extrusion head assemblies 70 may operate in parallel in a common extrusion head manifold supplied with extrudate from common supply lines for the main extrudate and the caramel colored extrudate supplied to auxilliary nozzle tube 88. Several extrudate streams 200 may be sliced a single cutter 100 and a like number of products may be laid down on a common product plate 112. All of the extrusion head assemblies 70, in this case, would be mounted on common tracking and transverse platforms 48 and 50 which will operate as described above.

The described apparatus and method produces frozen confections of arcuate configuration economically. The banana-like products are of uniform quality, are tasty and closely resemble in taste and texture, as well as appearance, natural bananas which have been frozen and coated with chocolate or other confection coating.

Although an air cylinder 60 has been used in the disclosed embodiments, it will be appreciated that equivalent drive means, such as cam means, can instead be used to impart the transverse movement to transverse platform 50.

While the invention has been particularly shown and described with reference to preferred embodiments thereof, it will be understood by those skilled in the art that the foregoing and other changes in form and detail may be made therein without departing from the spirit and scope of the invention.

We claim:

1. Apparatus for extruding arcuate products comprising:
    conveyor means movable only continuously in a forward direction;
    extrusion means positioned a distance above said conveyor means for extruding a semi-solid extrudate stream in said forward direction and depositing said extrudate stream upon said conveyor means;
    cutoff means for severing said extrudate stream into individual products deposited upon said conveyor means; and
    drive means suitable for displacing said extrusion means for each of said products from a starting position transversely of said forward direction as said extrudate stream is extruded and deposited upon said conveyor means and for displacing said extrusion means transversely of said forward direction back to said starting position, said drive means being such as to time said transverse displacement back to said starting position that each of said products is deposited with its end on said conveyor means at a position corresponding to said starting position but displaced therefrom along the conveyor.

2. Apparatus as recited in claim 1, wherein said extrusion means includes an extrusion nozzle having an extrusion aperture of substantially round configuration, whereby said products are substantially round in cross section.

3. Apparatus as recited in claim 1, wherein said drive means includes means for commencing outward transverse displacement just after said extrudate stream engages said conveyor means, continuing said displacement until about one half the length of said product has been deposited on said conveyor means and then immediately reversing said transverse movement returning said extrusion means back to said starting position just before said cutoff means severs said extrudate stream.

4. Apparatus as recited in claim 1, wherein said drive means includes means for commencing outward transverse displacement just after said extrudate stream engages said conveyor means, continuing said displacement until a substantial protion of the length of said product has been deposited on said conveyor means, maintaining said displacement at its maximum extent until said cutoff means severs said extrudate stream and then returning said extrusion means rapidly back to its starting point before the extrudate stream again engages said conveyor means.

5. Apparatus for extruding arcuate frozen confections comprising:
    conveyor means movable only continuously in a forward direction;
    extrusion means positioned a distance above said conveyor means for extruding the partially frozen semi-solid ingredients of said confections as a semi-solid extrudate stream in said forward direction and depositing said stream upon said conveyor means;
    cutoff means for severing said extrudate stream into individual partially frozen semi-solid products deposited upon said conveyor means; and
    drive means suitable for displacing said extrusion means from a starting position transversely of said forward direction as said extrudate stream is extruded and deposited upon said conveyor means and for displacing said extrusion means transversely of said forward direction back to said starting point, and means for timing said transverse displacement back to said starting position such that each of said partially frozen semi-solid products is deposited with its end on said conveyor means at a position corresponding to said starting position of said extrusion means but displaced along the conveyor means from the starting position.

6. Apparatus as recited in claim 5, wherein said extrusion means includes an extrusion nozzle having an extrusion aperture of substantially round configuration, whereby said products are substantially round in cross section, wherein said ingredients comprise primarily banana puree and ice cream, and wherein said products resemble bananas.

7. Apparatus as recited in claim 5, wherein said extrusion nozzle is provided with a plurality of protuberances for forming grooves in the surface of said products.

8. Apparatus as recited in claim 5, wherein said extrusion means further comprises an auxilliary nozzle tube within and concentric with said extrusion nozzle for providing extrudate of contrasting color within said products.

9. Apparatus for extruding frozen confections, comprising:
    extrusion means for extruding a semi-solid extrudate stream which is deposited upon conveyor means moving in the same direction as said extrudate stream, said semi-solid extrudate comprising the partially frozen ingredients of said confections, said extrusion means including an extrusion nozzle having an extrusion aperture of substantially round configuration, whereby said confections are substantially round in cross section, and an auxilliary nozzle tube within and concentric with said extrusion nozzle for providing extrudate of contrasting color within said confections, said auxiliary nozzle tube having a closed end, a plurality of slots adjacent said closed end and baffle means at the base of said slots for deflecting said extrudate in said extrusion nozzle, whereby a pattern of said extrudate of contrasting color is deposited within said confection;

drive means for displacing said extrusion means for each of said confections transversely of said direction as said extrudate stream is extruded and deposited upon said conveyor means, whereby each of said confections is arcuate; and cutoff means for severing said extrudate stream into individual confections deposited upon said conveyor means.

10. Apparatus for extruding arcuate frozen confection resembling bananas, said confections containing simulated banana seeds, comprising:

extrusion means for extruding a semi-solid extrudate stream which is deposited upon conveyor means moving in the same direction as said extrudate stream, said semi-solid extrudate comprising the partially frozen ingredients of said confections, said extrusion means including an extrusion nozzle having an extrusion aperture of substantially round configuration, whereby said confections are substantially round in cross section, said extrusion means further including means for forming simulated banana seeds comprising an auxiliary nozzle tube within and concentric with said extrusion nozzle for providing extrudate of contrasting color, said auxiliary nozzle tube having a closed end, a plurality of slots adjacent said closed end and baffle means at the base of said slots for deflecting said extrudate of contrasting color, whereby a pattern of said extrudate of contracting color is deposited within said confection to simulate said banana seeds;

drive means for displacing said extrusion means for each of said confections transversely of said direction as said extrudate stream is extruded and deposited upon said conveyor means, whereby each of said confections is arcuate; and cutoff means for severing said extrudate stream into individual confections deposited upon said conveyor means.

11. Apparatus for extruding arcuate products, comprising:

extrusion means positioned above conveyor means for extruding a semi-solid extrudate stream which is deposited upon said conveyor means, said conveyor means movable continuously in the same direction as said extrudate stream;

cutoff means for shearing said extrudate stream into individual products deposited upon said conveyor means;

first drive means suitable for displacing said extrusion means for each of said products from a starting position transversely of said direction as said extrudate stream is extruded and deposited upon said conveyor means and for displacing said extrusion means transversely of said forward direction back to said starting position, said drive means being such as to time said transverse displacement back to said starting position that each of said products is deposited with its end on said conveyor means at a position corresponding to said starting position; and second drive means for repeatedly moving said extrusion means from a starting point above said conveyor means in the same direction as said conveyor means, but at a slower speed, and after said extrudate stream is severed by said cutoff means, moving said extrusion means rapidly in the opposite direction back to said starting point so that said products as deposited on said conveyor means are spaced from each other.

12. Apparatus as recited in claim 11, wherein said extrusion means comprises an extrusion head assembly mounted on a platform and wherein said first and second drive means displace said platform to move said extrusion means in said transverse and same directions.

13. Extrusion apparatus for extruding a product, comprising:

an extrusion nozzle including an elongated extrusion chamber for extruding a main extrudate stream through a nozzle orifice at one end of said chamber; an auxilliary nozzle tube located within and centrally of said extrusion chamber for extruding an extrudate of contrasting color and having a closed end and a plurality of slots adjacent said closed end; and baffle means mounted on said auxilliary nozzle tube to deflect said main extrudate stream from said slots, whereby said extrudate of contrasting color is incorporated as a pattern within said main extrudate.

14. Extrusion apparatus as recited in claim 13, wherein said baffle means comprises fingers mounted upstream of said slots.

15. Extrusion apparatus as recited in claim 13, wherein said main extrudate comprises primarily banana puree with the addition of ice cream ingredients, and said extrudate of contrasting color comprises caramel color, whereby said pattern within said main extrudate simulates the appearance of banana seeds, and wherein said nozzle orifice has a plurality of protuberances, whereby the surface of said product has longitudinally extending grooves simulating the longitudinally extending grooves characteristic of the surface of a peeled banana.

16. Extrusion apparatus for extruding frozen confections resembling bananas, comprising:

an extrusion nozzle including an elongated extrusion chamber for extruding a main extrudate stream comprising primarily banana puree with the addition of ice cream ingredients through a nozzle orifice at one end of said chamber;

an auxiliary nozzle tube located within and centrally of said extrusion chamber for extruding an extrudate comprising caramel color contrasting with the color of said main extrudate stream, said auxiliary nozzle tube having a closed end and a plurality of slots adjacent said closed end; and baffle means mounted on said auxiliary nozzle tube to deflect said main extrudate stream from said slots, whereby said extrudate of contrasting color is incorporated as a pattern within said main extrudate to simulate banana seeds.

* * * * *